US009613211B1

(12) United States Patent
Chen et al.

(10) Patent No.: US 9,613,211 B1
(45) Date of Patent: Apr. 4, 2017

(54) SYSTEMS AND METHODS FOR IDENTIFYING SUSPICIOUS TEXT-MESSAGING APPLICATIONS ON MOBILE DEVICES

(71) Applicant: Symantec Corporation, Mountain View, CA (US)

(72) Inventors: Joseph Chen, Los Angeles, CA (US); Rui Jing, Los Angeles, CA (US)

(73) Assignee: Symantec Corporation, Mountain View, CA (US)

( * ) Notice: Subject to any disclaimer, the term of this patent is extended or adjusted under 35 U.S.C. 154(b) by 500 days.

(21) Appl. No.: 13/709,762

(22) Filed: Dec. 10, 2012

(51) Int. Cl.
*G06F 21/56* (2013.01)
*G06F 21/00* (2013.01)
*G06F 21/55* (2013.01)
*G06F 21/50* (2013.01)
*G06F 11/30* (2006.01)

(52) U.S. Cl.
CPC .................................. *G06F 21/566* (2013.01)

(58) Field of Classification Search
CPC .......... G06F 21/56; G06F 21/00; G06F 21/55; G06F 21/566; G06F 21/554; G06F 21/50; G06F 11/30; H04L 63/0263; H04L 63/1458
USPC ..................................................... 726/23–24
See application file for complete search history.

(56) References Cited

U.S. PATENT DOCUMENTS

| 2009/0240657 | A1* | 9/2009 | Grigsby | ................. | G06Q 10/10 |
| 2010/0285791 | A1* | 11/2010 | Pirskanen | ........... | H04W 74/002 455/422.1 |
| 2012/0005727 | A1* | 1/2012 | Lee | ......................... | H04L 9/321 726/3 |
| 2012/0233694 | A1* | 9/2012 | Baliga | .................. | G06F 21/568 726/23 |
| 2012/0303439 | A1* | 11/2012 | Flitcroft et al. | ............ | 705/14.36 |
| 2013/0100017 | A1* | 4/2013 | Papakipos | ........... | H04L 12/1845 345/158 |
| 2013/0226854 | A1* | 8/2013 | Zhang | ................. | G06F 17/3061 706/47 |
| 2013/0263261 | A1* | 10/2013 | Dawson et al. | ................ | 726/22 |

(Continued)

OTHER PUBLICATIONS

Ho et al. "Mobile and Ubiquitous Malware", Proceedings of MoMM2009, Dec. 14-16, 2009, Kuala Lumpur, Malaysia, pp. 559-563.*

(Continued)

*Primary Examiner* — Tae Kim
*Assistant Examiner* — Shiuh-Huei Ku
(74) *Attorney, Agent, or Firm* — FisherBroyles LLP

(57) ABSTRACT

A computer-implemented method for identifying suspicious text-messaging applications on mobile devices may include (1) identifying at least one outgoing text message on a mobile device, (2) analyzing at least one attribute of the outgoing text message identified on the mobile device, (3) determining that the outgoing text message is illegitimate based at least in part on analyzing the attribute of the outgoing text message, (4) identifying, in response to the determination, a suspicious text-messaging application that created the illegitimate outgoing text message on the mobile device, and then (5) performing, in response to the determination, at least one security action on the suspicious text-messaging application to prevent the suspicious text-messaging application from creating additional illegitimate text messages on the mobile device. Various other methods, systems, and computer-readable media are also disclosed.

17 Claims, 7 Drawing Sheets

(56) References Cited

U.S. PATENT DOCUMENTS

2013/0300652 A1* 11/2013 Raffle .................... A61B 3/113
                                                          345/156

OTHER PUBLICATIONS

Fuentes, et al. "Event-Based Method for Detecting Trojan Horese in Mobile Devices", May 27-28, 2010, A. U. Schmidt et al. (Eds.): MobiSec 2010, LNICST 47, pp. 153-162.*

Ho et al. "Mobile and Ubiquitous Malware", Proceedings of MoMM209, Dec. 14-16, 2009, Kula Lumpur, Malaysia, pp. 559-563.*

Fuentes et al. "Event-Based Method for Detecting Trojan Horses in Mobile Devices", May 27-28, 2010, A.U. Schmidt et al. (Eds.) MobiSec 2010, LNICST 47, pp. 153-162.*

* cited by examiner

SYSTEMS AND METHODS FOR IDENTIFYING SUSPICIOUS TEXT-MESSAGING APPLICATIONS ON MOBILE DEVICES

BACKGROUND

In today's world of vast computing technology, malicious technology users are often looking for new ways to exploit other people's computing devices for their own financial gain. For example, a malware author may develop a malicious premium-text application designed to infiltrate mobile phones belonging to unsuspecting victims. Upon infiltrating a victim's mobile phone, the premium-text application may automatically create one or more text messages and then direct the victim's mobile phone to send the text messages to a premium-rate telephone number associated with the malware author. By sending the text messages to the premium-rate telephone number, the victim's mobile phone may incur service charges that financially benefit the malware author at the victim's expense.

Unfortunately, such a premium-text application may implement polymorphic techniques that reduce the likelihood of being detected by conventional anti-malware solutions (such as signature-based security systems). What is needed, therefore, are systems and methods for identifying suspicious text-messaging applications on mobile devices based at least in part on the attributes of outgoing text messages.

SUMMARY

As will be described in greater detail below, the instant disclosure generally relates to systems and methods for identifying suspicious text-messaging applications on mobile devices based at least in part on the attributes of outgoing text messages.

In one example, a computer-implemented method for identifying suspicious text-messaging applications on mobile devices may include (1) identifying at least one outgoing text message on a mobile device, (2) analyzing at least one attribute of the outgoing text message identified on the mobile device, (3) determining that the outgoing text message is illegitimate based at least in part on analyzing the attribute of the outgoing text message, (4) identifying, in response to the determination, a suspicious text-messaging application that created the illegitimate outgoing text message on the mobile device, and then (5) performing, in response to the determination, at least one security action on the suspicious text-messaging application (by, e.g., removing the suspicious text-messaging application from the mobile device) to prevent the suspicious text-messaging application from creating additional illegitimate text messages on the mobile device.

In some examples, the method may also include identifying a physical orientation of the mobile device during a creation of the outgoing text message. In such examples, the method may further include determining that the physical orientation of the mobile device obstructed user access to at least one text-entry interface on the mobile device during the creation of the outgoing text message. For example, the method may include determining that the text-entry interface on the mobile device was lying against a physical surface during the creation of the outgoing text message. In addition, the method may include determining that the outgoing text message is illegitimate based at least in part on the physical orientation of the mobile device during the creation of the outgoing text message.

In some examples, the method may also include identifying an operating mode of the mobile device during a creation of the outgoing text message. In such examples, the method may further include determining that the operating mode of the mobile device prevented user access to the text-messaging application on the mobile device during the creation of the outgoing text message. For example, the method may include determining that the mobile device was locked during the creation of the outgoing text message. In addition, the method may include determining that the outgoing text message is illegitimate based at least in part on the operating mode of the mobile device during the creation of the outgoing text message.

In some examples, the method may also include identifying a content payload of the outgoing text message and performing at least one language analysis on the content payload of the outgoing text message to identify at least one human language used in the outgoing text message. In such examples, the method may further include identifying a geographic location of the mobile device during a creation of the outgoing text message and determining that the human language used in the outgoing text message is different than at least one other human language associated with the geographic location of the mobile device. In addition, the method may include determining that the outgoing text message is illegitimate based at least in part on the determination that the human language used in the outgoing text message is different than the other human language associated with the geographic location of the mobile device.

In some examples, the method may also include identifying a content payload of the outgoing text message and performing at least one semantic analysis on the content payload of the outgoing text message to determine whether the outgoing text message is human-readable. In such examples, the method may further include determining that the semantic analysis performed on the content payload of the outgoing text message indicates that the outgoing text message is not human-readable. In addition, the method may include determining that the outgoing text message is illegitimate based at least in part on the determination that the outgoing text message is not human-readable.

In some examples, the method may also include identifying a content payload of the outgoing text message and performing at least one size analysis on the content payload of the outgoing text message to determine whether the outgoing text message exceeds a predefined size standard. In such examples, the method may further include determining that the size analysis performed on the content payload of the outgoing text message indicates that the outgoing text message exceeds the predefined size standard. In addition, the method may include determining that the outgoing text message is illegitimate based at least in part on the determination that the outgoing text message exceeds the predefined size standard.

In some examples, the method may also include identifying at least one subsequent outgoing text message on the mobile device and performing at least one message-frequency analysis on the outgoing text message and the subsequent outgoing text message to determine whether the outgoing text message and the subsequent outgoing text message were created within a predefined time period of one another. In such examples, the method may further include determining that the message-frequency analysis indicates that the outgoing text message and the subsequent outgoing text message were created within the predefined time period of one another. In addition, the method may include determining that the outgoing text message and the subsequent outgoing text message are illegitimate based at least in part on the determination that the outgoing text message and the subsequent outgoing text message were created within the predefined time period of one another.

In some examples, the method may also include identifying at least one recipient of the outgoing text message and performing at least one contact-list analysis on at least one contact list associated with the mobile device to determine whether the recipient of the outgoing text message is identified in the contact list associated with the mobile device. In such examples, the method may further include determining that the contact-list analysis indicates that the recipient of the outgoing text message is not identified in the contact list associated with the mobile device. In addition, the method may include determining that the outgoing text message is illegitimate based at least in part on the determination that the recipient of the outgoing text message is not identified in the contact list associated with the mobile device.

In one embodiment, a system for implementing the above-described method may include (1) an identification module programmed to identify at least one outgoing text message on a mobile device, (2) an analysis module programmed to analyze at least one attribute of the outgoing text message identified on the mobile device, (3) a determination module programmed to determine that the outgoing text message is illegitimate based at least in part on the analysis of the attribute of the outgoing text message, (4) wherein the identification module is further programmed to identify, in response to the determination, a suspicious text-messaging application that created the illegitimate outgoing text message on the mobile device, and (5) a security module programmed to perform, in response to the determination, at least one security action on the suspicious text-messaging application that created the illegitimate outgoing text message to prevent the suspicious text-messaging application from creating additional illegitimate text messages on the mobile device. The system may also include at least one processor configured to execute the identification module, the analysis module, the determination module, and the security module.

In some examples, the above-described method may be encoded as computer-readable instructions on a non-transitory computer-readable-storage medium. For example, a non-transitory computer-readable-storage medium may include one or more computer-executable instructions that, when executed by at least one processor of a mobile device, may cause the mobile device to (1) identify at least one outgoing text message on the mobile device, (2) analyze at least one attribute of the outgoing text message identified on the mobile device, (3) determine that the outgoing text message is illegitimate based at least in part on the analysis of the attribute of the outgoing text message, (4) identify, in response to the determination, a suspicious text-messaging application that created the illegitimate outgoing text message on the mobile device, and then (5) perform, in response to the determination, at least one security action on the suspicious text-messaging application that created the illegitimate outgoing text message to prevent the suspicious text-messaging application from creating additional illegitimate text messages on the mobile device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
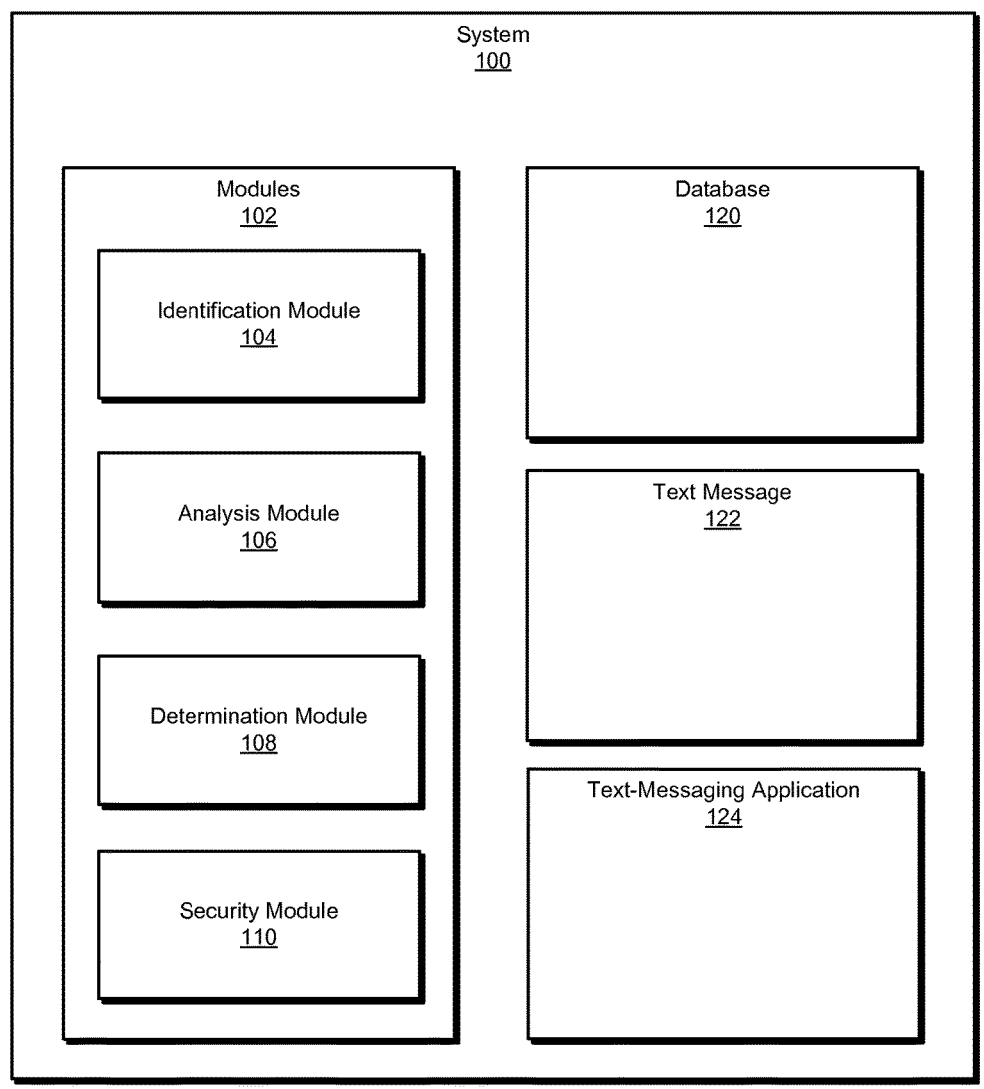
FIG. 1 is a block diagram of an exemplary system for identifying suspicious text-messaging applications on mobile devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for identifying suspicious text-messaging applications on mobile devices. As will be explained in greater detail below, by analyzing one or more attributes of at least one outgoing text message identified on a mobile device, the various systems and methods described herein may determine that the outgoing text message is illegitimate. By determining that the outgoing text message is illegitimate based at least in part on the attributes of the outgoing text message, the various systems and methods described herein may be able to determine that the text-messaging application that created the illegitimate outgoing text message is potentially malicious despite the text-messaging application's polymorphic capabilities.

Figure 2:
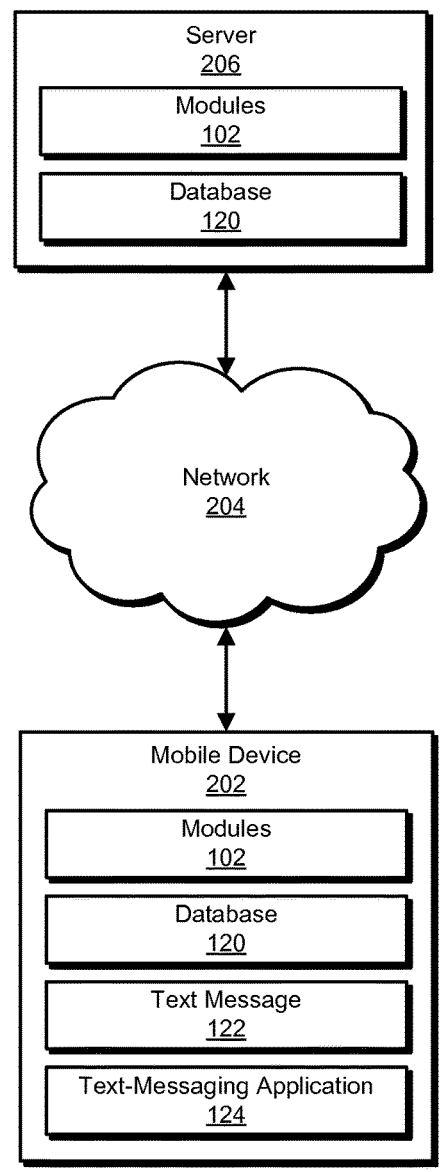
FIG. 2 is a block diagram of an exemplary system for identifying suspicious text-messaging applications on mobile devices.

The following will provide, with reference to FIGS. 1-2, detailed descriptions of exemplary systems for identifying suspicious text-messaging applications on mobile devices. Detailed descriptions of corresponding computer-implemented methods will be provided in connection with FIG. 3. Detailed descriptions of an exemplary physical orientation of a mobile device and exemplary text messages will be provided in connection with FIGS. 4 and 5, respectively. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for identifying suspicious text-messaging applications on mobile devices. As illustrated in this figure, exemplary system 100 may include one or more modules 102 for performing one or more tasks. For example, and as will be explained in greater detail below, exemplary system 100 may include an identification module 104 programmed to identify at least one outgoing text message on a mobile device. Exemplary system 100 may also include an analysis module 106 programmed to analyze at least one attribute of the outgoing text message identified on the mobile device.

In addition, and as will be described in greater detail below, exemplary system 100 may include a determination module 108 programmed to determine that the outgoing text message is illegitimate based at least in part on the analysis of the attribute of the outgoing text message. Exemplary system 100 may further include a security module 110 programmed to perform, in response to the determination, at least one security action on a suspicious text-messaging application that created the illegitimate outgoing text message to prevent the suspicious text-messaging application from creating additional illegitimate text messages on the mobile device. Although illustrated as separate elements, one or more of modules 102 in FIG. 1 may represent portions of a single module or application (such as SYMANTEC'S NORTON MOBILE SECURITY).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., mobile device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store information used in analyzing at least one outgoing text message on a mobile device and/or performing at least one security action on a text-messaging application that created the outgoing text message. For example, database 120 may store analysis information that identifies at least one analysis to be performed on the outgoing text message. In this example, database 120 may also store security information that identifies at least one security action to be performed on the text-messaging application that created the outgoing text message upon determining that the outgoing text message is illegitimate.

Database 120 may represent portions of a single database or computing device or a plurality of databases or computing devices. For example, database 120 may represent a portion of mobile device 202 and/or server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as mobile device 202 and/or server 206 in FIG. 2, computing system 610 in FIG. 6, and/or portions of exemplary network architecture 700 in FIG. 7.

As illustrated in FIG. 1, exemplary system 100 may also include one or more text messages, such as text message 122. For example, text message 122 may have been created by a text-messaging application installed on a mobile device. In this example, text message 122 may represent an illegitimate text message directed to a premium-rate telephone number. Examples of text message 122 include, without limitation, Short Message Service (SMS) messages, NOKIA'S SMART MESSAGING messages, Extended Message Service (EMS) messages, Multimedia Messaging Service (MMS) messages, and/or any other suitable text message.

As illustrated in FIG. 1, exemplary system 100 may further include one or more text-messaging applications, such as text-messaging application 124. For example, text-messaging application 124 may represent a third-party application downloaded and installed on a mobile device. In this example, text-messaging application 124 may have been used to create text message 122 on the mobile device. Examples of text-messaging application 124 include, without limitation, ANDROID.PREMIUMTEXT, ANDROID.POSITMOB, ANDROID.FAKEMINI, and/or any other text-messaging application capable of creating one or more text messages on a mobile device.

Exemplary system 100 in FIG. 1 may be implemented in a variety of ways. For example, all or a portion of exemplary system 100 may represent portions of exemplary system 200 in FIG. 2. As shown in FIG. 2, system 200 may include a mobile device 202 in communication with a server 206 via a network 204. Mobile device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of mobile device 202 and/or server 206, facilitate mobile device 202 and/or server 206 in identifying suspicious text-messaging applications on mobile devices. For example, and as will be described in greater detail below, one or more of modules 102 may cause mobile device 202 and/or server 206 to (1) identify text message 122 on mobile device 202, (2) analyze at least one attribute of text message 122 identified on mobile device 202, (3) determine that text message 122 is illegitimate based at least in part on the analysis of the attribute of text message 122, (4) identify, in response to the determination, text-messaging application 124 as having created text message 122 on mobile device 202, and then (5) perform, in response to the determination, at least one security action on text-messaging application 124 to prevent text-messaging application 124 from creating additional illegitimate text messages on mobile device 202.

Mobile device 202 generally represents any type or form of computing device capable of reading computer-executable instructions. Examples of mobile device 202 include, without limitation, laptops, tablets, desktops, servers, cellular phones, Personal Digital Assistants (PDAs), multimedia players, embedded systems, combinations of one or more of the same, exemplary computing system 610 in FIG. 6, and/or any other suitable computing device.

Server 206 generally represents any type or form of computing device capable of providing at least one mobile device with information used in identifying a suspicious text-messaging application installed on the mobile device.

Examples of server 206 include, without limitation, application servers, web servers, storage servers, and/or database servers configured to run certain software applications and/or provide various web, storage, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between mobile device 202 and server 206.

Figure 3:
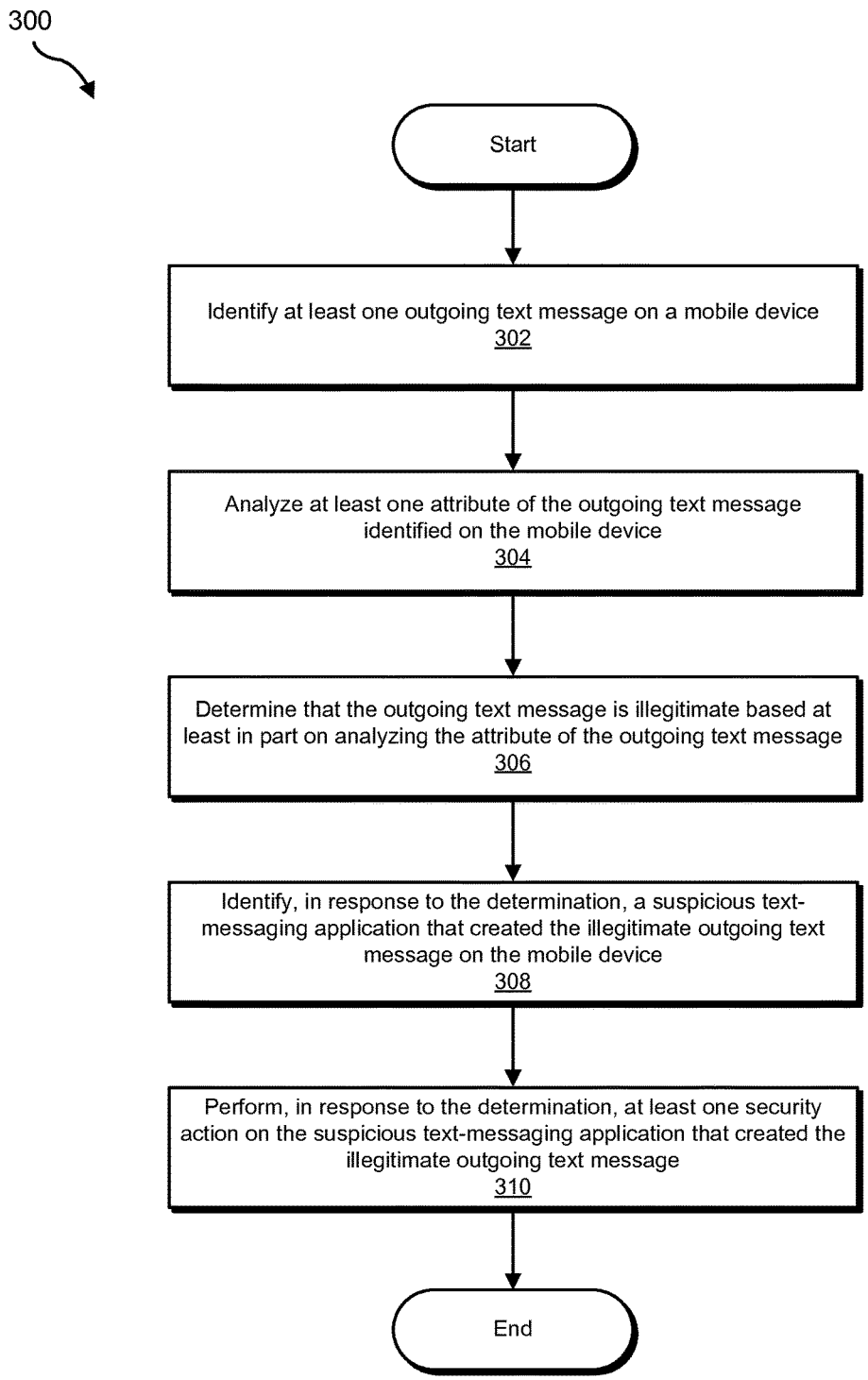
FIG. 3 is a flow diagram of an exemplary method for identifying suspicious text-messaging applications on mobile devices.

FIG. 3 is a flow diagram of an exemplary computer-implemented method 300 for identifying suspicious text-messaging applications on mobile devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify at least one outgoing text message on a mobile device. For example, at step 302 identification module 104 may, as part of mobile device 202 in FIG. 2, identify text message 122 on mobile device 202. In this example, text message 122 may represent an outgoing text message directed to a phone number associated with at least one recipient device (not illustrated in FIG. 2).

The systems described herein may perform step 302 in a variety of ways. In some examples, identification module 104 may identify text message 122 as mobile device 202 sends text message 122 to the phone number associated with the recipient device. In one example, identification module 104 may monitor at least one text-messaging communication interface associated with mobile device 202 for any text-messaging activity occurring at the communication interface. In this example, while monitoring the text-messaging communication interface, identification module 104 may identify text message 122 as the text-messaging communication interface sends text message 122 from mobile device 202 to the recipient device.

In another example, identification module 104 may monitor at least one text-messaging activity log that records a history of text-messaging communications associated with mobile device 202. For example, while monitoring the text-messaging activity log, identification module 104 may identify a newly created entry associated with text message 122. In this example, the newly created entry may include information that identifies the contents of text message 122. Additionally or alternatively, the newly created entry may include a reference that identifies a memory location currently storing the contents of text message 122 on mobile device 202.

In some examples, identification module 104 may identify text message 122 as the text message is created on mobile device 202. In one example, identification module 104 may determine that text-messaging application 124 installed on mobile device 202 has certain text-messaging capabilities. Upon determining that text-messaging application 124 installed on mobile device 202 has such text-messaging capabilities, identification module 104 may monitor text-messaging application 124 for any text-messaging activity originating from text-messaging application 124. While monitoring text-messaging application 124, identification module 104 may identify text message 122 as text-messaging application 124 creates text message 122 on mobile device 202.

In some examples, identification module 104 may identify text message 122 after mobile device 202 has sent text message 122 to the recipient device. For example, mobile device 202 may send a copy of text message 122 to the recipient device. In this example, mobile device 202 may also retain a copy of text message 122 and store the copy at an onboard memory location accessible to identification module 104. Identification module 104 may later identify the copy of text message 122 stored at the onboard memory location.

In other examples, identification module 104 may identify text message 122 after text-messaging application 124 has created text message 122 but before mobile device 202 has sent text message 122 to the recipient device. For example, identification module 104 may intercept text message 122 en route to the text-messaging communication interface associated with mobile device 202. In this example, identification module 104 may then identify text message 122 before the text-messaging communication interface sends text message 122 from mobile device 202 to the recipient device.

Figure 5:
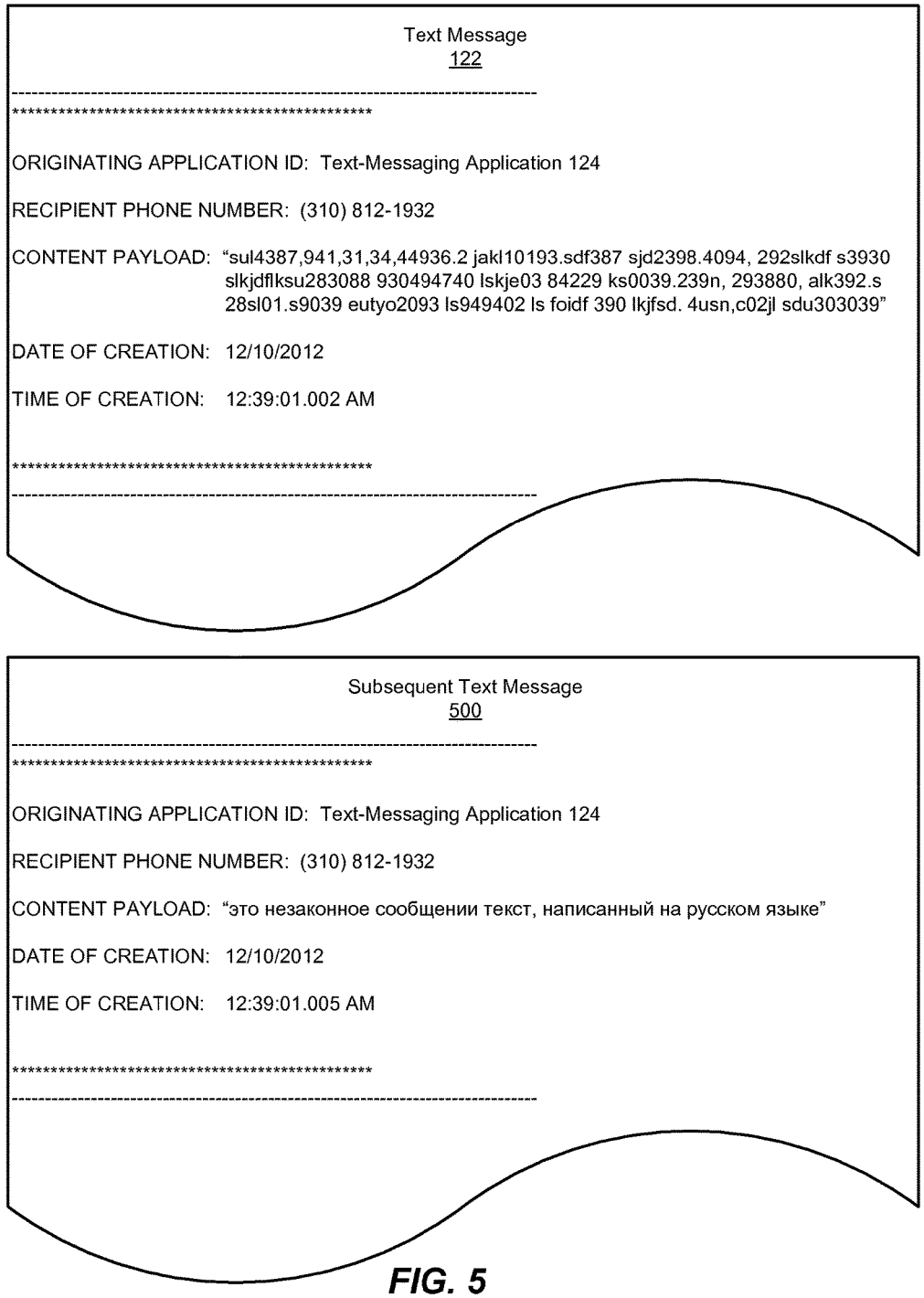
FIG. 5 is an illustration of an exemplary text message and an exemplary subsequent text message.

As illustrated in FIG. 5, text message 122 may include information that identifies the text-messaging application that created the text message (in this example, "Text-Messaging Application 124"), at least one phone number associated with at least one intended recipient of the text message (in this example, "(310) 812-1932"), the content payload of the text message (in this example, "sul4387,941, 31,34,44936.2 jak110193.sdf387 sjd2398.4094, 292slkdf s3930 slkjdflksu283088 930494740 lskje03 84229 ks0039.239n, 293880, alk392.s 28s101.s9039 eutyo2093 ls949402 ls foidf 390 lkjfsd. 4usn,c02j1 sdu303039"), the date on which the text message was created (in this example, "12/10/2012"), and the time at which the text message was created (in this example, "12:39:01.002 AM," which corresponds to [hours]:[minutes]:[seconds].[milliseconds][12-hour clock indicator]).

As illustrated in FIG. 3, at step 304 one or more of the systems described herein may analyze one or more attributes of the outgoing text message identified on the mobile device. For example, at step 304 analysis module 106 may, as part of mobile device 202 in FIG. 2, analyze one or more attributes of text message 122 identified on mobile device 202. Examples of such attributes include, without limitation, the text message's date of creation, the text message's time of creation, a physical orientation of mobile device 202 at the text message's time of creation, an operating mode of mobile device 202 at the text message's time of creation, at least one intended recipient of the text message, metadata associated with the text message, a content payload of the text message, at least one human language used in the text message, the level of human-readability of the text message, a content size of the text message, a difference between the text message's time of creation or transmission and a subsequent text message's time of creation or transmission, and/or any other suitable attributes of the text message.

The systems described herein may perform step 304 in a variety of ways. In some examples, analysis module 106 may scan text message 122 to identify a content payload of text message 122. For example, while scanning text message 122, analysis module 106 may identify "sul4387,941,31,34, 44936.2 jak110193.sdf387 sjd2398.4094, 292slkdf s3930 slkjdflksu283088 930494740 lskje03 84229 ks0039.239n, 293880, alk392.s 28s101.s9039 eutyo2093 ls949402 ls foidf 390 lkjfsd. 4usn,c02j1 sdu303039" as the content payload of text message 122. As will be described in greater detail below, upon identifying the content payload of text message 122, analysis module 106 may perform one or more analyses on the content payload in an effort to determine whether text message 122 is illegitimate.

The phrase "content payload," as used herein, generally refers to any type or form of content included in a text message and configured to be displayed to a recipient of the text message via the recipient's computing device. Examples of the content payload include, without limitation, one or more text characters (such as alphanumeric and/or symbol characters), photographic images, video images, optically scanned images, computer-generated images, and/ or any other suitable content included in a text message.

In one example, upon identifying the content payload of text message 122, analysis module 106 may perform at least one semantic analysis on the content payload to determine whether text message 122 is human-readable. For example, analysis module 106 may compare at least a portion of the content payload of text message 122 with one or more written words, abbreviations, colloquialisms, and/or symbols associated with one or more human languages (e.g., English, Spanish, French, Russian, Chinese, and/or Quechua). Upon performing this comparison, analysis module 106 may determine that the portion of the content payload does not include a sufficient number or proportion of the written words, abbreviations, colloquialisms, and/or symbols to reach a predefined level of human-readability. The phrase "semantic analysis," as used herein, generally refers to any type or form of algorithm used to determine whether a text message fails to reach a predefined level of human-readability.

In one example, upon identifying the content payload of text message 122, analysis module 106 may perform at least one size analysis on the content payload to determine whether text message 122 exceeds a predefined size standard. For example, analysis module 106 may identify 196 text characters included in the content payload of text message 122. Upon identifying the 196 text characters included in the content payload of text message 122, analysis module 106 may determine that this number of text characters exceeds a predefined standard of 160 text characters. The phrase "size analysis," as used herein, generally refers to any type or form of algorithm used to determine whether a text message exceeds a predefined size standard.

In some examples, analysis module 106 may scan text message 122 to identify metadata associated with text message 122. For example, while scanning text message 122, analysis module 106 may identify "(310) 812-1932" as the phone number associated with the intended recipient of text message 122. In this example, upon identifying the "(310) 812-1932" phone number, analysis module 106 may perform a contact-list analysis on at least one contact list associated with mobile device 202 to determine whether the "(310) 812-1932" phone number corresponds to at least one contact included in the contact list. The phrase "contact-list analysis," as used herein, generally refers to any type or form of algorithm used to determine whether a contact list associated with a mobile device includes the intended recipient of a text message.

In some examples, analysis module 106 may identify at least one subsequent outgoing text message on mobile device 202. For example, analysis module 106 may identify subsequent text message 500. As illustrated in FIG. 5, subsequent text message 500 may include information that identifies the text-messaging application that created the subsequent text message (in this example, "Text-Messaging Application 124"), at least one phone number associated with at least one intended recipient of the subsequent text message (in this example, "(310) 812-1932"), the content payload of the subsequent text message (in this example, " это незаконное сообщении текст, написанный на русском языке "), the date on which the subsequent text message was created (in this example, "12/10/2012"), and the time at which the subsequent text message was created (in this example, "12:39:01.005 AM," which corresponds to [hours]:[minutes]:[seconds].[milliseconds] [12-hour clock indicator]).

In some examples, analysis module 106 may scan subsequent text message 500 to identify a content payload of subsequent text message 500. For example, while scanning subsequent text message 500, analysis module 106 may identify "это незаконное сообщении текст, написанный на русском языке " as the content payload of subsequent text message 500. Upon identifying the content payload of subsequent text message 500, analysis module 106 may perform one or more analyses on the content payload in an effort to determine whether subsequent text message 500 is illegitimate.

In one example, analysis module 106 may perform at least one language analysis on the content payload of subsequent text message 500 to identify at least one human language used in subsequent text message 500. For example, analysis module 106 may select the "это незаконное сообщении текст " portion of the content payload as a sample to be used in the language analysis. Upon selecting the "это незаконное сообщении текст " portion of the content payload, analysis module 106 may compare the set of text characters included in this portion of the content payload with one or more written words, abbreviations, colloquialisms, and/or symbols associated with one or more human languages.

Analysis module 106 may then determine that the "это незаконное сообщении текст " portion of the content payload is written in Russian based at least in part on this comparison. The phrase "language analysis," as used herein, generally refers to any type or form of algorithm used to identify at least one human language used in a text message.

In some examples, analysis module 106 may analyze one or more attributes of text message 122 in conjunction with one or more attributes of subsequent text message 500 in an effort to determine whether these text messages are illegitimate. In one example, analysis module 106 may perform at least one message-frequency analysis on text message 122 and subsequent text message 500 to determine whether these text messages were created within a predefined time period of one another. For example, analysis module 106 may compare the "12:39:01.002 AM" creation time of text message 122 with the "12:39:01.005 AM" creation time of subsequent text message 500. Upon performing this comparison, analysis module 106 may determine that text message 122 and subsequent text message 500 were created within 3 milliseconds of one another.

Analysis module 106 may then determine that this 3 millisecond difference between the creation times indicates that text message 122 and subsequent text message 500 were not created in response to user input entered by a user of mobile device 202. The phrase "message-frequency analysis," as used herein, generally refers to any type or form of algorithm used to determine whether the difference between a text message's time of creation or transmission and at least one subsequent text message's time of creation or transmission indicates that these text messages are illegitimate.

As illustrated in FIG. 3, at step 306 one or more of the systems described herein may determine that the outgoing text message is illegitimate based at least in part on analyzing the attributes of the outgoing text message. For example, at step 306 determination module 108 may, as part of mobile device 202 in FIG. 2, determine that text message 122 is illegitimate based at least in part on analyzing the attributes of text message 122. The term "illegitimate," as used herein, generally refers to any type or form of state or condition in which a text message was automatically created by a potentially malicious application without user consent or user input.

The systems described herein may perform step 306 in a variety of ways. In one example, determination module 108 may identify the physical orientation of mobile device 202 during the creation of text message 122. For example, determination module 108 may determine that mobile device 202 was positioned in physical orientation 402 in FIG. 4 at the approximate point in time that text message 122 was created on mobile device 202. In this example, determination module 108 may further determine that physical orientation 402 of mobile device 202 was obstructing user access to text-entry interface 408 in FIG. 4 at the approximate point in time that text message 122 was created on mobile device 202.

Figure 4:
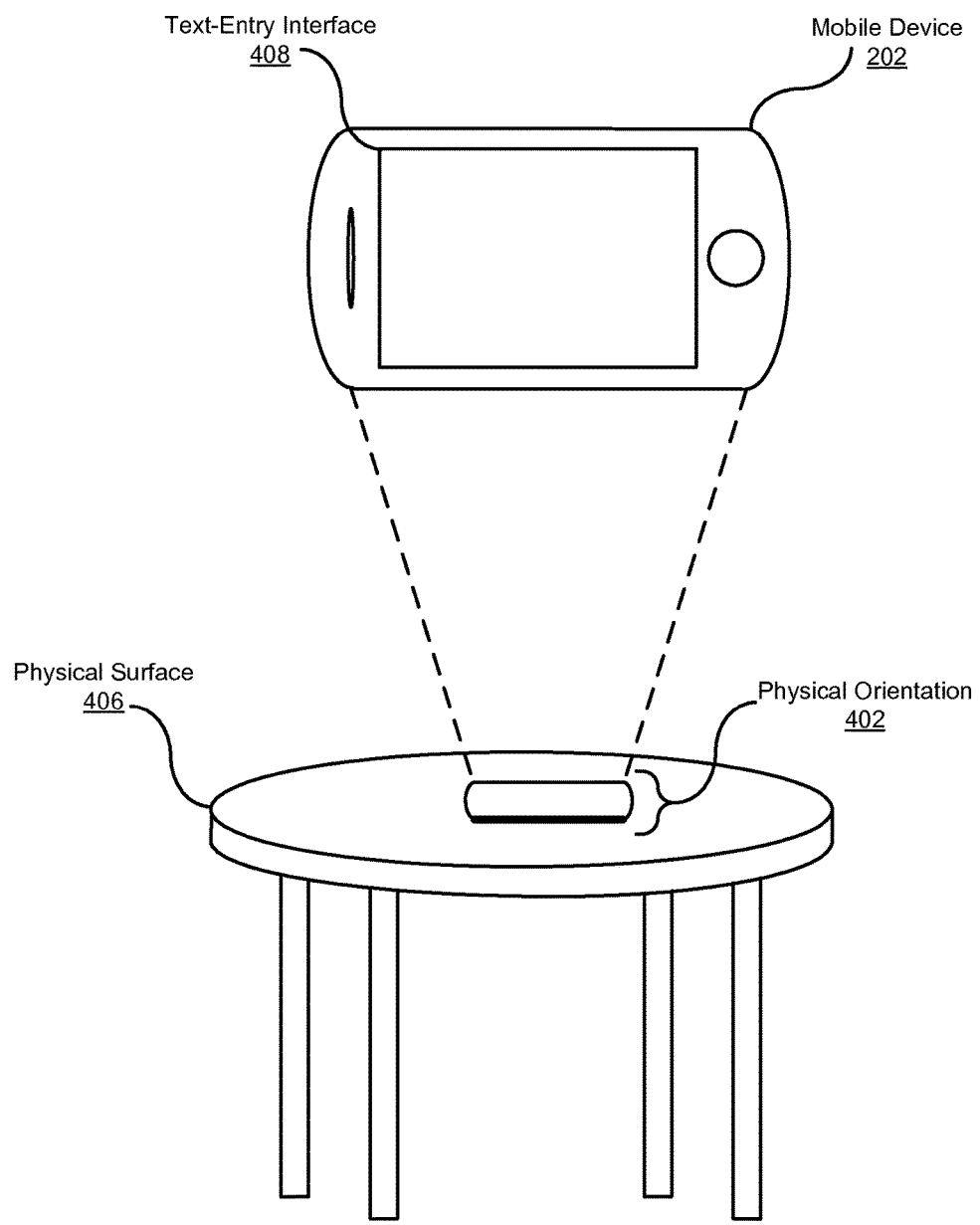
FIG. 4 is an illustration of an exemplary physical orientation of a mobile device lying on a physical surface.

As illustrated in FIG. 4, physical orientation 402 may represent a position in which text-entry interface 408 of mobile device 202 is lying against physical surface 406. In this example, determination module 108 may determine that text message 122 is illegitimate at least in part since physical orientation 402 would have prevented the user of mobile device 202 from entering user input via text-entry interface 408 during the creation of text message 122. In other words, the user of mobile device 202 would have been unable to enter user input via text-entry interface 408 due to physical orientation 402 since text-entry interface 408 was lying against physical surface 406 during the creation of text message 122. Examples of text-entry interface 408 include, without limitation, keyboards, keypads, touchscreens, stylus-based interfaces, button-based interfaces, combinations of one or more of the same, and/or any other suitable text-entry interface.

In one example, determination module 108 may identify the operating mode of mobile device 202 during the creation of text message 122. For example, determination module 108 may determine that mobile device 202 was locked at the approximate point in time that text-messaging application 124 created text message 122. In this example, determination module 108 may then determine that the user of mobile device 202 would have been unable to access text-messaging application 124 at the approximate point in time that text-messaging application 124 created text message 122 since mobile device 202 was locked. Determination module 108 may further determine that text message 122 is illegitimate at least in part since mobile device 202 was locked at the approximate point in time that text-messaging application 124 created text message 122.

In one example, determination module 108 may determine that text message 122 is not human-readable. For example, determination module 108 may determine that the semantic analysis performed on the portion of the content payload of text message 122 indicates that text message 122 fails to reach a predefined level of human-readability. In this example, determination module 108 may then determine that text message 122 is illegitimate at least in part since text message 122 fails to reach the predefined level of human-readability.

In one example, determination module 108 may determine that text message 122 exceeds a predefined size standard. For example, determination module 108 may determine that the size analysis performed on the content payload of text message 122 indicates that the 196 text characters included in the content payload exceed the predefined standard of 160 text characters. In this example, determination module 108 may then determine that text message 122 is illegitimate at least in part since the 196 text characters included in the content payload exceed the predefined standard of 160 text characters.

In one example, determination module 108 may determine that the intended recipient of text message 122 is not identified in the contact list associated with mobile device 202. For example, determination module 108 may determine that the contact-list analysis performed on the contact list associated with mobile device 202 indicates that the "(310) 812-1932" phone number of the intended recipient does not correspond to any of the contacts included in the contact list. In this example, determination module 108 may then determine that text message 122 is illegitimate at least in part since the "(310) 812-1932" phone number of the intended recipient does not correspond to any of the contacts included in the contact list associated with mobile device 202.

In one example, determination module 108 may identify the geographic location of mobile device 202 during the creation of subsequent text message 500. For example, determination module 108 may access a set of geographic coordinates produced by a Global Positioning System (GPS) associated with mobile device 202 at the approximate point in time that subsequent text message 500 was created on mobile device 202. In this example, determination module 108 may analyze the set of geographic coordinates produced by the GPS to determine the geographic location of mobile device 202 at the approximate point in time that subsequent text message 500 was created on mobile device 202. Determination module 108 may then determine that mobile device 202 was located in China during the creation of subsequent text message 500 based at least in part on this analysis of the geographic coordinates produced by the GPS.

In one example, determination module 108 may determine that the human language used in subsequent text message 500 is different than at least one other human language associated with the geographic location where mobile device 202 was located during the creation of subsequent text message 500. For example, determination module 108 may determine that the "это незаконное сообщении текст" portion of the content payload selected as the sample during the language analysis was written in Russian. In this example, determination module 108 may then determine that Russian is not commonly used in China where mobile device 202 was located during the creation of subsequent text message 500. Determination module 108 may further determine that subsequent text message 500 is illegitimate at least in part since the "это незаконное сообщении текст" portion of the content payload was written in Russian but Russian is not commonly used in China where mobile device 202 was located during the creation of text message 122.

In one example, determination module 108 may determine that text message 122 and subsequent text message 500 were created within a predefined time period of one another. For example, determination module 108 may determine that the message-frequency analysis performed on text message 122 and subsequent text message 500 indicates that these text messages were not created in response to user input entered by the user of mobile device 202 but, rather, automatically created without the user's consent. In this example, determination module 108 may then determine that text message 122 and subsequent text message 500 are illegitimate at least in part since these text messages were not created in response to user input entered by the user of mobile device 202 but, rather, automatically created without the user's consent.

As illustrated in FIG. 3, at step 308 one or more of the systems described herein may identify a suspicious text-messaging application that created the illegitimate outgoing text message on the mobile device. For example, identification module 104 may, as part of mobile device 202, identify text-messaging application 124 as having created text message 122 on mobile device 202. In this example, identification module 104 may initiate the identification process in response to the determination that text message 122 is illegitimate.

The systems described herein may perform step 308 in a variety of ways. In one example, identification module 104 may determine that text-messaging application 124 created text message 122 based at least in part on the metadata associated with text message 122. For example, while scanning text message 122 in FIG. 4, identification module 104 may identify "Text-Messaging Application 124" as the application from which illegitimate text message 122 originated. In this example, identification module 104 may then classify text-messaging application 124 as potentially malicious since text-messaging application 124 created illegitimate text message 122.

In another example, identification module 104 may implement a whitelisting technique to deduce the identity of the text-messaging application that created illegitimate text message 122. For example, identification module 104 may access a whitelist that identifies one or more applications with text-messaging capabilities that have very trustworthy reputations on mobile device 202. Upon accessing the whitelist, identification module 104 may determine that the only installed application with text-messaging capabilities that is not identified in the whitelist is text-messaging application 124. Identification module 104 may then determine that text-messaging application 124 is likely to have created illegitimate text message 122 since the whitelist indicates that all of the other applications with text-messaging capabilities installed on mobile device 202 are very trustworthy.

As illustrated in FIG. 3, at step 310 one or more of the systems described herein may perform at least one security action on the suspicious text-messaging application that created the illegitimate outgoing text message to prevent the suspicious text-messaging application from creating additional illegitimate text messages on the mobile device. For example, security module 110 may, as part of mobile device 202, perform at least one security action on text-messaging application 124 to prevent text-messaging application 124 from creating additional illegitimate text messages on mobile device 202. In this example, security module 110 may initiate performance of the security action in response to the determination that text message 122 is illegitimate. By preventing text-messaging application 124 from creating additional illegitimate text messages on mobile device 202, the security action may enable the user of mobile device 202 to avoid additional service charges associated with such illegitimate text messages.

The systems described herein may perform step 310 in a variety of ways. In one example, security module 110 may remove text-messaging application 124 from mobile device 202. In another example, security module 110 may block text-messaging application 124 from being executed by mobile device 202. In a further example, security module 110 may quarantine text-messaging application 124 on mobile device 202.

As explained above in connection with method 300 in FIG. 3, a text-messaging application may create one or more illegitimate text messages on a mobile device. For example, a user of a mobile phone may download and install a seemingly harmless third-party application on his or her mobile phone. Unfortunately, this third-party application may also include a bundled premium-text application (such as ANDROID.PREMIUMTEXT, ANDROID.POSITMOB, or ANDROID.FAKEMINI) that implements polymorphic techniques to avoid detection by conventional anti-malware solutions (such as signature-based security systems). After the user has downloaded and installed this third-party application on his or her mobile phone, the premium-text application may create a series of outgoing text messages and then direct the user's mobile phone to send the same to the premium-rate telephone number.

The user's mobile phone may include a mobile security system (such as SYMANTEC'S NORTON MOBILE SECURITY) that detects and identifies the outgoing text messages as the user's mobile phone sends the same to the premium-rate telephone number. The mobile security system may then analyze one or more attributes of the identified text messages (including, e.g., date of creation, time of creation, physical orientation of the user's mobile device at the time of creation, operating modes of the user's mobile device at the time of creation, intended recipients, metadata, content payload, human languages, the level of human-readability, content size, and/or frequency). Upon analyzing the attributes of the identified text messages, the mobile security system may determine that the text messages are illegitimate.

In response to determining that the text messages are illegitimate, the mobile security system may identify an application ID associated with the application that created the text messages. For example, the mobile security system may identify and analyze metadata associated with the text messages. The mobile security system may then locate an application ID associated with the premium-text application while analyzing the metadata.

Upon identifying the application ID associated with the premium-text application, the mobile security system may determine that the premium-text application is potentially malicious since the premium-text application created the illegitimate text messages on the user's mobile phone. The mobile security system may then remove the premium-text application from the user's mobile phone to prevent the premium-text application from creating additional illegitimate text messages on the user's mobile phone. By removing the premium-text application from the user's mobile phone, the mobile security system may enable the user to avoid additional service charges associated with such illegitimate text messages.

Figure 6:
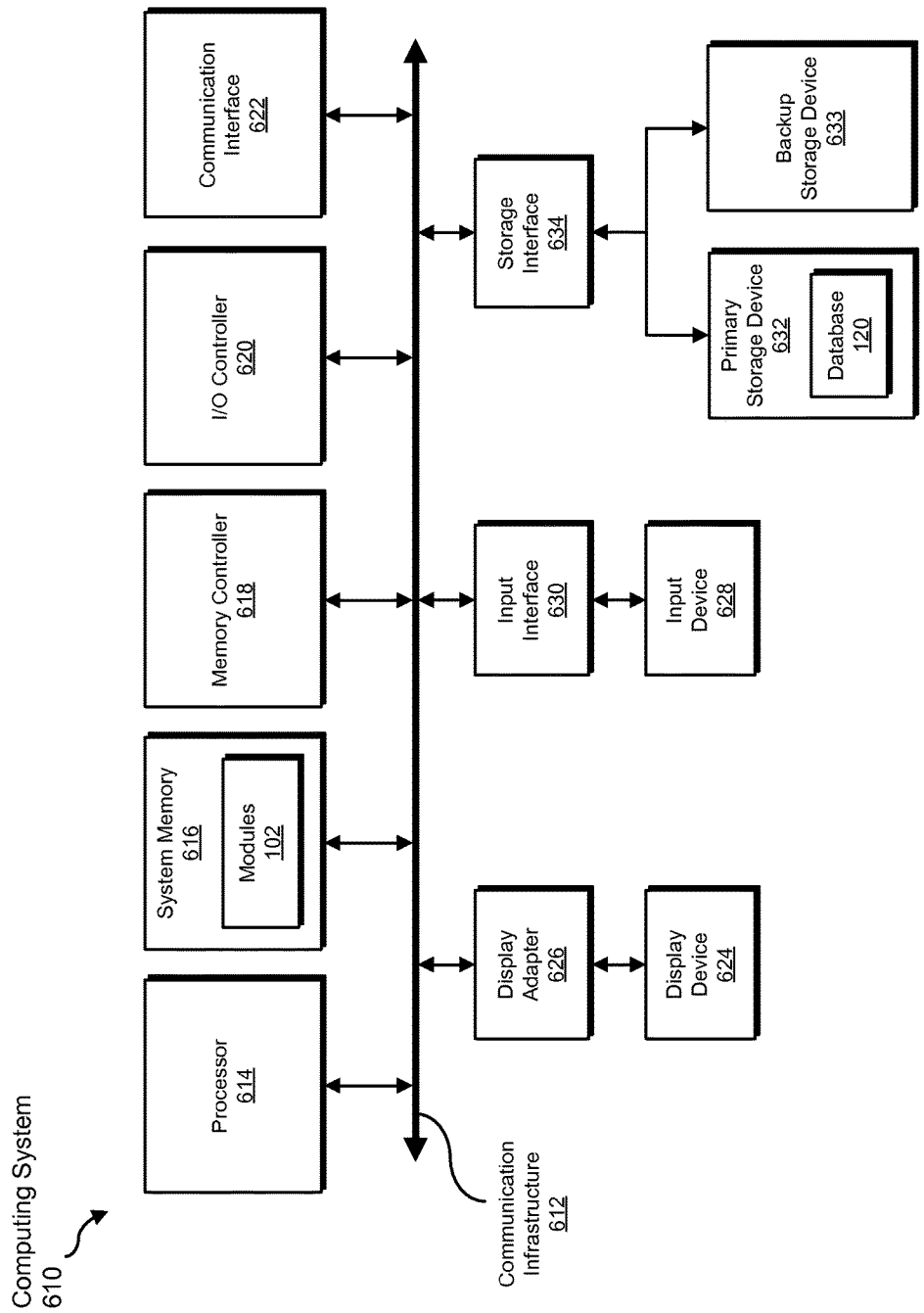
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, analyzing, determining, performing, and removing steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
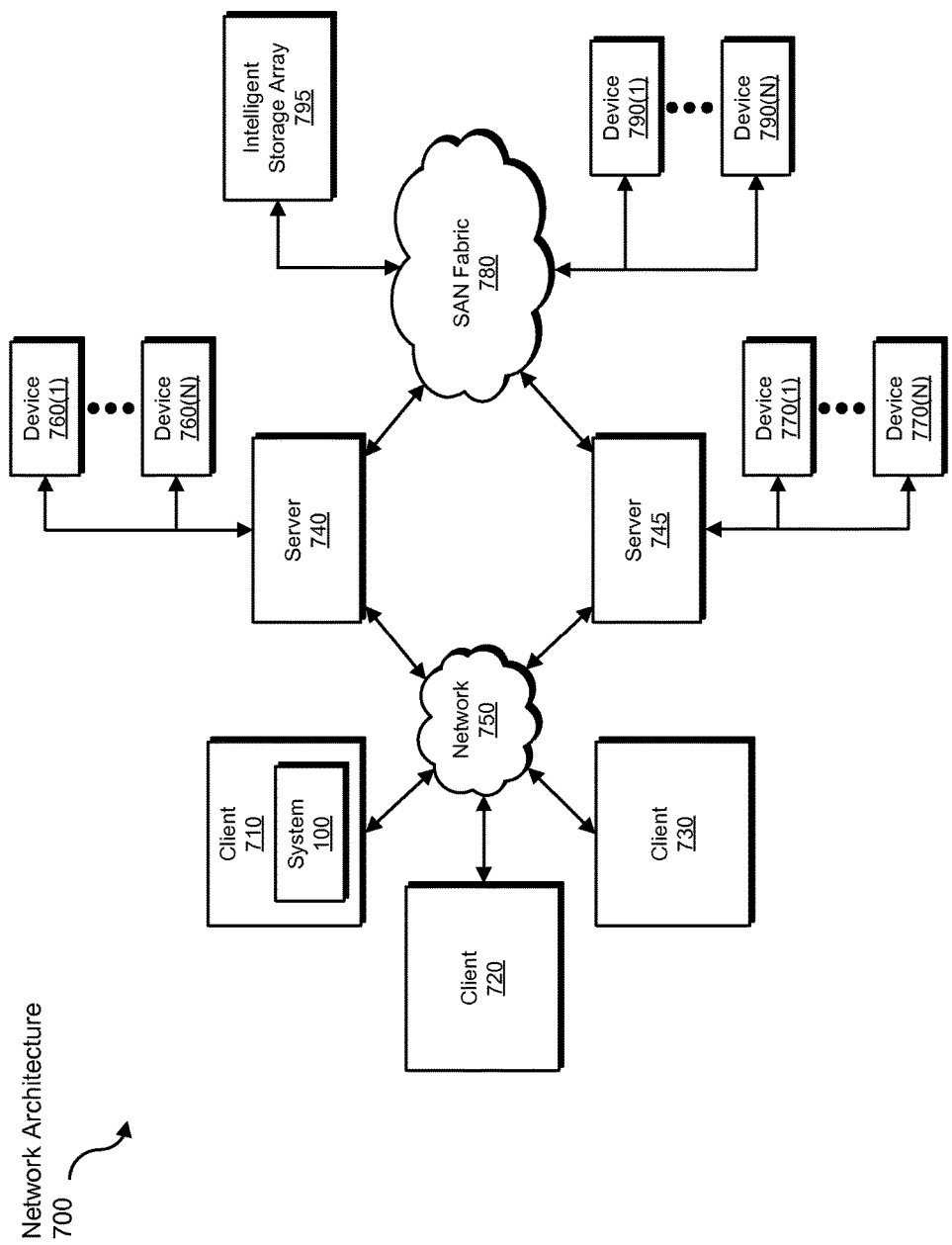
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, analyzing, determining, performing, and removing steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for identifying suspicious text-messaging applications on mobile devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive at least one outgoing text message created by a text-messaging application installed on a mobile device, analyze one or more attributes of the outgoing text message created by the text-messaging application, determine that the outgoing text message created by the text-messaging application is illegitimate based at least in part on the analysis of the text message's attributes, and then transform the text-messaging application by removing the text-messaging application from the mobile device in response to the determination that the outgoing text message created by the text-messaging application is illegitimate. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for identifying suspicious text-messaging applications on mobile devices, at least a portion of the method being performed by a computing device comprising at least one processor, the method comprising:

identifying at least one outgoing text message on a mobile device;

analyzing at least one attribute of the outgoing text message identified on the mobile device, wherein the attribute of the outgoing text messaging indicates a state of the mobile device when the outgoing text message was generated, by at least one of:
  identifying a physical orientation of the mobile device during a creation of the outgoing text message and determining that the physical orientation of the mobile device obstructed user access to at least one text-entry interface on the mobile device during the creation of the outgoing text message; and
  identifying an operating mode of the mobile device during a creation of the outgoing text message and determining that the operating mode of the mobile device prevented user access to the text-messaging application on the mobile device during the creation of the outgoing text message;
determining that the outgoing text message is illegitimate based at least in part on analyzing the attribute of the outgoing text message; and
in response to determining that the outgoing text message is illegitimate:
  identifying a suspicious text-messaging application that created the illegitimate outgoing text message on the mobile device; and
  performing at least one security action on the suspicious text-messaging application that created the illegitimate outgoing text message to prevent the suspicious text-messaging application from creating additional illegitimate text messages on the mobile device.

2. The method of claim 1, wherein determining that the physical orientation of the mobile device obstructed user access to the text-entry interface on the mobile device comprises determining that the text-entry interface on the mobile device was lying against a physical surface during the creation of the outgoing text message.

3. The method of claim 1, wherein determining that the operating mode of the mobile device prevented user access to the text-messaging application on the mobile device comprises determining that the mobile device was locked during the creation of the outgoing text message.

4. The method of claim 1, wherein analyzing the attribute of the outgoing text message identified on the mobile device comprises:
  identifying a content payload of the outgoing text message;
  performing at least one language analysis on the content payload of the outgoing text message to identify at least one human language used in the outgoing text message.

5. The method of claim 4, wherein determining that the outgoing text message is illegitimate comprises:
  identifying a geographic location of the mobile device during a creation of the outgoing text message;
  determining that the human language used in the outgoing text message is different than at least one other human language associated with the geographic location of the mobile device;
  determining that the outgoing text message is illegitimate based at least in part on the determination that the human language used in the outgoing text message is different than the other human language associated with the geographic location of the mobile device.

6. The method of claim 1, wherein analyzing the attribute of the outgoing text message identified on the mobile device comprises:
  identifying a content payload of the outgoing text message;
  performing at least one semantic analysis on the content payload of the outgoing text message to determine whether the outgoing text message is human-readable.

7. The method of claim 6, wherein determining that the outgoing text message is illegitimate comprises:
  determining that the semantic analysis performed on the content payload of the outgoing text message indicates that the outgoing text message is not human-readable;
  determining that the outgoing text message is illegitimate based at least in part on the determination that the outgoing text message is not human-readable.

8. The method of claim 1, wherein analyzing the attribute of the outgoing text message identified on the mobile device comprises:
  identifying a content payload of the outgoing text message;
  performing at least one size analysis on the content payload of the outgoing text message to determine whether the outgoing text message exceeds a predefined size standard.

9. The method of claim 8, wherein determining that the outgoing text message is illegitimate comprises:
  determining that the size analysis performed on the content payload of the outgoing text message indicates that the outgoing text message exceeds the predefined size standard;
  determining that the outgoing text message is illegitimate based at least in part on the determination that the outgoing text message exceeds the predefined size standard.

10. The method of claim 1, wherein analyzing the attribute of the outgoing text message identified on the mobile device comprises:
  identifying at least one subsequent outgoing text message on the mobile device;
  performing at least one message-frequency analysis on the outgoing text message and the subsequent outgoing text message to determine whether the outgoing text message and the subsequent outgoing text message were created within a predefined time period of one another.

11. The method of claim 10, wherein determining that the outgoing text message is illegitimate comprises:
  determining that the message-frequency analysis indicates that the outgoing text message and the subsequent outgoing text message were created within the predefined time period of one another;
  determining that the outgoing text message and the subsequent outgoing text message are illegitimate based at least in part on the determination that the outgoing text message and the subsequent outgoing text message were created within the predefined time period of one another.

12. The method of claim 1, wherein analyzing the attribute of the outgoing text message identified on the mobile device comprises:
  identifying at least one recipient of the outgoing text message;
  performing at least one contact-list analysis on at least one contact list associated with the mobile device to determine whether the recipient of the outgoing text message is identified in the contact list associated with the mobile device.

13. The method of claim 12, wherein determining that the outgoing text message is illegitimate comprises:

determining that the contact-list analysis indicates that the recipient of the outgoing text message is not identified in the contact list associated with the mobile device;

determining that the outgoing text message is illegitimate based at least in part on the determination that the recipient of the outgoing text message is not identified in the contact list associated with the mobile device.

14. The method of claim 1, wherein the security action performed on the suspicious text-messaging application comprises removing the suspicious text-messaging application from the mobile device.

15. A system for identifying suspicious text-messaging applications on mobile devices, the system comprising:

an identification module programmed to identify at least one outgoing text message on a mobile device;

an analysis module programmed to analyze at least one attribute of the outgoing text message identified on the mobile device, wherein the attribute of the outgoing text message indicates a state of the mobile device when the outgoing text message was generated, by at least one of:

identifying a physical orientation of the mobile device during a creation of the outgoing text message and determining that the physical orientation of the mobile device obstructed user access to at least one text-entry interface on the mobile device during the creation of the outgoing text message; and identifying an operating mode of the mobile device during a creation of the outgoing text message and determining that the operating mode of the mobile device prevented user access to the text-messaging application on the mobile device during the creation of the outgoing text message;

a determination module programmed to determine that the outgoing text message is illegitimate based at least in part on the analysis of the attribute of the outgoing text message;

wherein the identification module is further programmed to identify, in response to the determination, a suspicious text-messaging application that created the illegitimate outgoing text message on the mobile device;

a security module programmed to perform, in response to the determination, at least one security action on the suspicious text-messaging application that created the illegitimate outgoing text message to prevent the suspicious text-messaging application from creating additional illegitimate text messages on the mobile device; and at least one processor configured to execute the identification module, the analysis module, the determination module, and the security module.

16. The system of claim 15, wherein the determination module is further programmed to determine that the text-entry interface on the mobile device was lying against a physical surface during the creation of the outgoing text message.

17. A non-transitory computer-readable-storage medium comprising one or more computer-executable instructions that, when executed by at least one processor of a mobile device, cause the mobile device to:

identify at least one outgoing text message on the mobile device;

analyze at least one attribute of the outgoing text message identified on the mobile device, wherein the attribute of the outgoing text message indicates a state of the mobile device when the outgoing text message was generated, by at least one of:

identifying a physical orientation of the mobile device during a creation of the outgoing text message and determining that the physical orientation of the mobile device obstructed user access to at least one text-entry interface on the mobile device during the creation of the outgoing text message; and identifying an operating mode of the mobile device during a creation of the outgoing text message and determining that the operating mode of the mobile device prevented user access to the text-messaging application on the mobile device during the creation of the outgoing text message;

determine that the outgoing text message is illegitimate based at least in part on the analysis of the attribute of the outgoing text message; and in response to the determination that the outgoing text message is illegitimate:

identify a suspicious text-messaging application that created the illegitimate outgoing text message on the mobile device; and perform at least one security action on the suspicious text-messaging application that created the illegitimate outgoing text message to prevent the suspicious text-messaging application from creating additional illegitimate text messages on the mobile device.

* * * * *